United States Patent [19]

Harding et al.

[11] 4,026,848

[45] May 31, 1977

[54] AQUEOUS PHENOLIC RESOLE DISPERSION CONTAINING GUM GHATTI INTERFACIAL AGENT

[75] Inventors: James Harding, Green Brook; Neil Justin McCarthy, Jr., Warren Township, both of N.J.

[73] Assignee: Union Carbide Corporation, New York, N.Y.

[22] Filed: Oct. 21, 1975

[21] Appl. No.: 624,561

Related U.S. Application Data

[63] Continuation-in-part of Ser. No. 495,139, Aug. 6, 1974, abandoned.

[52] U.S. Cl. .................................................. 260/17.2
[51] Int. Cl.$^2$ ............................................ C08L 5/00
[58] Field of Search ................................... 260/17.2

[56] References Cited

UNITED STATES PATENTS

| | | | |
|---|---|---|---|
| 2,069,178 | 1/1937 | Dent et al. | 260/17.2 |
| 2,245,245 | 6/1941 | Lynn | 260/17.2 |
| 2,967,836 | 1/1961 | Moffitt | 260/17.2 |
| 3,616,181 | 10/1971 | Stalego | 161/170 |
| 3,823,103 | 7/1974 | Harding | 260/17.2 |

OTHER PUBLICATIONS

Industrial Gums, pp. 268–269, Whistler et al. (ed.), 1973.
Chem. Absts. 78: 125,358q, "Aqueous dispersions—Phenolic Resin," Harding.
Chem. Absts. 62: 13345b, "Suspension Polym.—Gums as Additives," Chomitz.

*Primary Examiner*—Edward M. Woodberry
*Attorney, Agent, or Firm*—Aldo John Cozzi

[57] ABSTRACT

Aqueous phenolic resole dispersions are disclosed. The dispersions are produced in the presence of gum ghatti and a thickening agent. The dispersions of the invention contain phenolic resole particles that can be very small and uniform in size, thereby enhancing the utility of said dispersions in such end-use applications as coatings and adhesives.

11 Claims, No Drawings

AQUEOUS PHENOLIC RESOLE DISPERSION CONTAINING GUM GHATTI INTERFACIAL AGENT

This application is a continuation-in-part of our application Ser. No. 495,139, filed Aug. 6, 1974, now abandoned.

The invention relates to aqueous phenolic resole dispersions containing gum ghatti and a thickening agent.

In U.S. Pat. No. 3,823,103, there is disclosed aqueous phenolic resole dispersions that are produced in the presence of gum arabic and at least one other gum. These dispersions are characterized by excellent stability and the ability to be infinitely diluted with water. In a preferred aspect, they can have particles whose average diameters are between about 5 to 20 microns, with substantially all the resin particles having diameters less than 40 microns.

In the text "Industrial Gums — Polysaccharides and Their Derivatives", edited by Whistler and BeMiller (Academic Press, New York and London — 1973), on page 268 it is stated that gum ghatti is a better emulsifier than gum arabic. On page 352 of the same text, it is stated that Psyllium seed gum is recommended as a replacement for gum arabic as an emulsifier, and on page 357, flax seed gum is similarly recommended. Carboxy methyl cellulose, which in many ways can be considered to be a synthetic gum, is often recommended as a replacement for gum arabic in emulsions.

The inventors herein have attempted to produce aqueous resole dispersions by procedures analogous to the process of this invention, and using, in turn, Psyllium seed gum, flax seed gum, and carboxy methyl cellulose as the interfacial agent. In each case, the results were unsatisfactory. No phase inversion was obtained, therefore, no resin-in-water dispersion was produced.

What the foregoing discussion demonstrates is that the usefulness and effectiveness of a gum in the production of aqueous resole dispersions cannot be predicted from its known performance in the end-use applications in which gums have heretofore been employed.

The invention provides an aqueous dispersion containing dispersed particles of a phenolic resole, gum ghatti, and a thickening agent. The invention also provides a process for producing such dispersions which comprises reacting a phenol with an aldehyde in the presence of a basic catalyst, said reaction being carried out for a period of time and at a temperature sufficient to produce a substantially water-insoluble phenolic resole, and dispersing said phenolic resole in an aqueous medium in the presence of gum ghatti and a thickening agent.

The aldehydes employed to produce the phenolic resole can be formaldehyde of a material that provides the reaction mixture with formaldehyde or its equivalent such as para-formaldehyde or hexamethylenetetramine, acetaldehyde, furfural, acrolein, or other aldehyde. Formaldehyde is preferred, especially as the aqueous solution known as "formalin".

The phenols that can be employed to produce the resoles employed in the invention include unsubstituted phenol (i.e., monohydroxybenzene), and various substituted monohydric and polyhydric phenols. Illustrative examples include o-, m-, and p-cresol, ethylphenol, propylphenol, para-tert.-butylphenol and other butylphenols, amylphenol, octylphenol, cyclohexylphenol, nonylphenol, dodecylphenol, and other alkylphenols; para-phenylphenol; styrenated phenol; halogenated phenols such as chloro- and bromophenols; hydroquinone; and bisphenols such as 2,2-bis(4-hydroxyphenyl)propane (bisphenol-A) and bis(4-hydroxyphenyl)-methane.

Monohydric phenols employed will normally be dior trifunctional. That is, 2 or 3 of the positions ortho and para to the phenolic hydroxyl will normally be unsubstituted. Bisphenols are usually tetrafunctional, although up to 2 of the reactive positions ortho to the phenolic hydroxyl can be substituted.

Ordinarily, from about 0.5 to about 4 moles, and preferably from about 1 to about 3 moles, of aldehyde per mole of phenol will be employed. As is known in the art, more aldehyde is employed when the phenol is a bisphenol than when a monohydric phenol is used.

In producing a phenolic resole, an alkaline catalyst is employed. Specific illustrative catalysts include alkali metal and alkaline earth metal hydroxides, oxides, or carbonates, such as sodium hydroxide, potassium hydroxide, barium hydroxide, calcium oxide, sodium carbonate, and the like; ammoniacal compounds such as ammonia, hexamethylenetetramine, and quaternary ammonium hydroxides; and amines such as ethylenediamine, trimethylamine, dimethylamine, and N,N-dimethyl ethanolamine.

The catalyst is employed in catalytically significant proportions, such as, from about 0.007 to about 0.4, and preferably from about 0.01 to about 0.1 equivalents of catalyst per mole of phenol.

The aqueous dispersions of the invention are produced by a process which comprises reacting a phenol with an aldehyde in the presence of an alkaline catalyst to produce a substantially water-insoluble phenolic resole, and dispersing said resole in an aqueous medium in the presence of gum ghatti and a thickening agent.

A convenient way to carry out the process is the following:

Charge the phenol, aldehyde, and catalyst to a reaction vessel having conventional agitation, heat transfer, reflux, and control means. It is convenient to include an inert diluent to act as a reaction medium. Water is preferred, and will normally be added with the aldehyde, since aqueous formaldehyde is the aldehyde used in most cases. The condensation reaction between the phenol and aldehyde is usually initiated by applying external heat to the reaction mixture until the condensation reaction starts. Thereafter, the exothermic nature of the reaction keeps it going at the beginning of the reaction. Temperature control is normally achieved by refluxing at a controlled pressure, with external heating or cooling being employed as needed. The condensation reaction is continued until at least a low viscosity resole is produced. The viscosity should be low enough so that, with the shear available in the reaction vessel, the resole can be broken down into a small particle size resin.

At this point, additional water can be added to the reaction mixture, along with the gum ghatti and thickening agent. In order to enhance the stability of the resole, it is sometimes desirable to neutralize the alkaline catalyst before further processing. The pH of the reaction mixture should normally be about 9 or less, preferably about 3 to about 7.5, and more preferably about 4.5 to about 6.5, after the initial phenol/aldehyde condensation reaction is completed, i.e., after neutralization, if required. The particular pH selected depends, in part, upon the nature of the phenol and the end-use application intended for the dispersion. Coagulation may occur at pH's much below 3. Also, since gum ghatti is an anionic dispersing agent, the addition of cationic, as well as some anionic, surfactants to the dispersions of the invention may cause coagulation.

An important feature of the invention is that the resole is dispersed in water, in the presence of gum ghatti and thickening agent, in situ. That is, the resole is dispersed in water before it is isolated from the reaction mixture. If the resole is isolated from the reaction mixture, and then later re-dispersed in water, it will not be possible to obtain nearly as fine a particle size, nor will the dispersion be as stable.

The gum ghatti and/or thickening agent can be in the reaction mixture from the beginning of the phenol-/aldehyde condensation reaction. However, it is preferred to carry out the condensation reaction until a low viscosity resin is produced, and then add gum ghatti, thickening agent, and more water if necessary. (At this point, the resin may still be at least partially soluble in water. The resole may not become substantially water-insoluble until after neutralization and/or bodying.) Enough water must be present in the dispersion to enable a phase inversion to take place, i.e., to yield a resin-in-water dispersion (the water being the continuous phase). Typical maximum resole solids concentrations are within the range of from about 40 to about 50 weight percent determined by measuring the weight loss of a 1.5 gram sample after 3 hours in a 135° C. oven. When the phenol is unsubstituted phenol, the maximum permissible solids content tends to be near the lower end of this range. When the phenol is bis-phenol-A, the maximum permissible solids content tends to be near the upper part of the range, and when the phenol is an alkyl phenol, the maximum permissible solids content tends to be near the middle of the range. Of course, more water may be employed. However, for various commercial reasons (such as the desire to keep shipping costs low), it is usually preferred to maintain the water content as low as possible.

As has been pointed out above, the best time to add gum ghatti, thickening agent, and additional water (as needed) to the reaction mixture, is not later than that point in the reaction when a low viscosity resin is produced. (The condensation reaction is carried out at elevated temperatures, e.g., 75° to 105° C., and at these temperatures the resole will be liquid.) One or two experiments will probably be required to determine the best point at which to add the gum ghatti, thickening agent, and water, for particular resoles. However, phenolic resin chemists, who have been making resoles commercially for 40+ years, are fully capable of determining that point after having read this disclosure.

The dispersion of the resole in water will be effected by applying shear to the reaction mixture containing substantially water-insoluble resole, water, gum ghatti, and thickening agent. Agitation of the reaction mixture is the most convenient way to provide the requisite shear.

The resole must be substantially water-insoluble. While it varies somewhat, depending on the exact nature of the resole, normally to be water-insoluble, the resole must have a weight average molecular weight of at least about 400. The resoles of the invention can have weight average molecular weights of up to about 3000 or more. Weight average molecular weight can be determined by known procedures, e.g., see Moore, "J. Poly. Sci., Part A," 2, 835, 1964.

In order to attain the degree of advancement of the resole that is desired for the end-use application for which it is intended, it is often desirable to subject the resole to elevated temperature for a controlled period of time after addition of gum ghatti, thickening agent, and water, and, if it is done, after neutralization of the catalyst. This treatment is often called "bodying" the resin. It is ordinarily carried out at a temperature of from about 80° C. to 95° C., for a period of about 5 minutes up to 2 hours or more. When the resole is a thermosetting material, the advancement can be followed by periodically testing the resole for its 150° C. gel time (e.g., every 15 to 20 minutes) until the desired degree of advancement is attained. Phenolic resin chemists are well acquainted with this concept, and know how much advancement is needed for particular end-use applications.

Gum ghatti and a thickener are employed to produce the dispersions of the invention. Gum ghatti is a naturally occurring plant exudate obtained from the stems of *Anogeissue latifolia*, a plant that is abundant in India and Sri Lanka (Ceylon). It is a polysaccharide containing D-galactose, mannose, glucuronic acid, and rhamnose units. The gum ghatti is employed in an amount sufficient to form and stabilize a dispersion of resole particles in water. Effective amounts of gum ghatti will ordinarily be found within the range of from about 0.5 to about 5, and preferably from about 1 to about 3, parts by weight, per 100 parts by weight of phenol charged to the reaction mixture.

The thickening agent that is employed can be one or more of the following materials: gums such as guar gum, gum carregeenin, algin gum, locust bean gum; and water-soluble polymers such as ethylene-maleic acid copolymer, ionomers, poly(acrylamide), methyl vinyl ether-maleic anhydride copolymer; and any other water-soluble polymeric material that increases the viscosity of water and is compatible with the other components of the dispersion.

The thickening agent is employed in an amount sufficient to increase the viscosity of the dispersion to at least about 500 centipoises at 23° C. As a general rule, an effective amount of thickening agent will usually be found within the range of from about 0.1 to about 1, and preferably from about 0.25 to about 0.8, parts by weight, per 100 parts by weight of phenol charged to the reaction mixture.

The individual phenolic resole particles contained in the aqueous dispersions of the invention can be smaller and more uniform in size than those of the phenolic dispersions produced using gum arabic as the interfacial agent. For instance, dispersions produced in accordance with the invention can have particles having virtually all of their diameters below 5 microns, with their average diameters being between about 1 and 3 microns. While the invention does include dispersions whose particles are larger (for instance, wherein the average particle diameters are below about 12 microns, with virtually all the particle diameters being below about 25 microns), for many end use applications the utility is enhanced when the particle size is smaller and more uniform. Examples of such end use applications include adhesive and coating applications wherein the phenolic dispersion is employed in conjunction with an addition polymer latex such as an acrylic latex.

The smallest and most uniform particle size dispersions that we have made to date using gum arabic as the interfacial agent, have particles whose diameters vary from about 5 to about 10 microns.

The following Examples illustrate the practice of the invention:

EXAMPLE 1

Into a 5-liter, round bottom flask, equipped with a reflux condenser, agitator, thermometer, and heating mantle, there was charged the following:

| | |
|---|---|
| Phenol | 1200 grams |
| 40 per cent Aqueous Formaldehyde | 1668 grams |
| 25 per cent Aqueous Sodium Hydroxide | 100 grams |

This mixture was heated, with agitation, to a temperature of 70° C., whereupon the heating mantle was removed and the reaction mixture allowed to rise in temperature to atmospheric reflux through its exothermic heat of reaction. (The reaction temperature at atmospheric reflux is about 102° C.) The initial vigor of the reaction was moderated as necessary to prevent excessive flooding of the condenser by cooling with a cold water bath.

This mixture was allowed to reflux for about 30 minutes. At the end of this reflux period, the following were added in the order listed:

| | |
|---|---|
| Water | 720 grams |
| Gum Ghatti | 24 grams |
| Guar Gum | 6 grams |
| 20 per cent Aqueous Sulfuric Acid | 138 grams |

After mixing for five minutes, the pH was found to be 5.2.

The contents of the flask were then heated to 80° C., and held at about 80° C. for 40 minutes. At the end of this 40 minutes, the contents of the flask were cooled to below 30° C. and discharged into a suitable container as a dispersion of phenolic resole in water having the following properties:

| | |
|---|---|
| Solids | 41.2 per cent |
| pH | 5.5 |
| Hot Plate Gel (150° C.) | 110 seconds |
| Viscosity (Brookfield) | 1050 centipoises at 25° C. |
| Particle Size (by microscope examination) | 1–3 microns |

No significant settling of the resin particles was apparent after 16 weeks at room temperature. The dispersion could be infinitely diluted with water.

The guar gum used in the above example is a commercial product sold by Stein, Hall & Company, Inc., under the designation "Jaguar J2Sl."

The gum ghatti employed in this and other Examples was "Grade 1", and was obtained either from Stein, Hall or from Matheson, Coleman, & Bell.

CONTROL 1

This experiment illustrates the effect of using gum ghatti alone, without the thickening agent.

The apparatus and procedure of Example 1 were used with the exception that no guar gum was added. The following were charged to the five-liter flask:

| | |
|---|---|
| Phenol | 1200 grams |
| 40 per cent Aqueous Formaldehyde | 1668 grams |
| 25 per cent Aqueous Sodium Hydroxide | 100 grams |

This mixture was heated to 71° C., the heating mantle removed, and the temperature allowed to rise by the exothermic heat of reaction. The mixture was allowed to react for about 30 minutes at atmospheric reflux. At the end of the 30 minutes, the following were added in the order listed:

| | |
|---|---|
| Water | 720 grams |
| Gum Ghatti | 24 grams |
| 20 per cent Aqueous Sulfuric Acid | 135 grams |

The pH of the resulting mixture was adjusted to 5.6 by addition of 10 grams of 25 percent aqueous sodium hydroxide.

The contents of the flask were then heated to about 80° C., held at that temperature for about 60 minutes, and cooled to below 30° C. The resulting dispersion of a phenolic resole had particles ranging from about 2 to about 30 microns. This was in marked contrast to the 1–3 microns sized particles in the product of Example 1. Because of the larger particles and the lower viscosity of the product of this experiment, settling was rapid.

EXAMPLE 2

Preparation of Phenolic Dispersion (Bisphenol-A Derived) Using Ghatti Gum With Guar Gum Into a 5-liter, round bottom flask, equipped with a reflux condenser, agitator, thermometer, and heating mantle, there was charged 1200 grams of Bisphenol-A, 924 grams of aqueous formaldehyde (40 percent) and 14.4 grams of aqueous sodium hydroxide (25 percent). The mixture was heated to about 90° C. whereupon the heating mantle was removed and the mixture allowed to reach a stage of reflux at 95° C., under vacuum such that the pressure on the reaction mixture was 5–6 inches of mercury below atmospheric. The mixture was then refluxed for 60 minutes at 95° C. with additional heat provided as necessary. At the end of the 60-minute period, 864 grams of water, 24 grams of ghatti gum, and 3.6 grams of guar gum (Jaguar 507 — Stein, Hall & Company, Inc.) were added to the contents of the flask with vigorous agitation. Then 10.8 grams of 42 percent aqueous phosphoric acid were added to the flask and the pH adjusted to 6.2. The contents of the flask were then brought to a temperature of about 90° C. and maintained at this temperature for 90 minutes. At the end of this time, the contents of the reaction flask were cooled to a temperature below 50° C. and discharged as a resin-in-water dispersion having a solids content of 48 percent by weight and a 150° C. gel of 155 seconds. The dispersion viscosity (Brookfield spindle No. 2 at 30 rpm) was 1050 cps. and the resin particle size was substantially between 2 and 5 microns. This material did not separate at all after standing for 13 weeks.

CONTROL 2

Preparation of Phenolic Dispersion (Bisphenol-A Derived) Without Use of Thickening Agent A phenolic dispersion was prepared substantially as in the preceding Example 2, except that no guar gum was added to the reaction mixture. The viscosity of this dispersion (Brookfield spindle No. 2 at 30 rpm) was 150 cps. and the resin particle size ranged from 2 to 25 microns with an average size of about 10 microns. This material settled to the extent of about 25 percent after standing for 3 weeks.

EXAMPLE 3

Preparation of Phenolic Dispersion (Bisphenol-A Derived) Locust Bean Gum Replacing Guar Gum Into a 5-liter, round bottom flask, equipped with a reflux condenser, agitator, thermometer, and heating mantle, there was charged 1000 grams of Bisphenol-A, 770 grams of aqueous formaldehyde (40 percent), and 12.2 grams of aqueous sodium hydroxide (25 percent). The mixture was heated to 90° C. whereupon the heating mantle was removed and the mixture allowed to reach a stage of reflux at 95° C. under an absolute pressure of 5-6 inches of mercury below atmospheric. The mixture was then refluxed for 60 minutes at 95° C. with additional heat provided as necessary. At the end of the 60-minute period, 770 grams of water, 20 grams of ghatti gum, and 6.5 grams of locust bean gum (175 mesh — from Stein, Hall) were added to the contents of the flask with vigorous agitation. Then 8.0 grams of aqueous phosphoric acid (42 percent) were added to the flask and the pH adjusted to 6.5. The contents of the flask were then brought to a temperature of about 90° C. and maintained at this temperature for 120 minutes. At the end of this time, the contents of the reaction flask were cooled to a temperature below 50° C. and discharged as a resin-in-water dispersion having a solids content of 48 percent by weight and a 150° C. hot plate gel time of 171 seconds. The viscosity of the dispersion was 2000 cps. (Brookfield spindle No. 2 at 30 rpm), and the dispersed resin particle size was substantially between 2 and 5 microns in diameter. This material did not settle significantly after standing for 8 weeks.

EXAMPLE 4

Preparation of Phenolic Dispersion (Bisphenol-A Derived) With Sodium Alginate Replacing Guar Gum The same formulation and procedure as Example 3 was followed, except that 4.5 grams of sodium alginate ("Alginic acid, Sodium Salt — Practical" from Matheson, Coleman & Bell) replaced 6.5 grams of locust bean gum. The dispersion's viscosity (Brookfield spindle No. 2 at 30 rpm) was 770 cps. and the resin particle size was substantially between 2 and 5 microns in diameter. This material did not settle at all after standing for 3 weeks. After 8 weeks, settling was less than 5 percent.

EXAMPLE 5

Preparation of Phenolic Dispersion (Bisphenol-A Derived) "EMA-81" (Ethylene/Maleic Anhydride Copolymer from Monsanto) Replacing Guar Gum The same procedure and formulation as Example 3 were used, except 7.0 grams of EMA-81 replaced 6.5 grams of locust beam gum and no phosphoric acid was used to neutralize the reaction mixture. The dispersion's viscosity was 16,400 cps. and the resin particle size was substantially between 2 and 5 microns in diameter. This material did not settle after standing for 7 weeks.

Probably, a lower concentration of EMA-81 would be desirable in some cases, in order to yield a dispersion having a lower viscosity, which would be easier to handle.

EXAMPLE 6

Preparation of Phenolic Dispersion (Alkyl Phenol Derived) Using Ghatti Gum and Guar Gum Into a 5-liter, round bottom flask, equipped with a reflux condenser, agitator, thermometer and heating mantle, there was charged 1200 grams of para-t-butylphenol, 1200 grams of aqueous 40 percent formalin, and 36 grams of aqueous sodium hydroxide (25 percent). The mixture was heated to 73° C., whereupon the heating mantle was removed and the mixture allowed to reach 80° C., at which temperature it was kept for 2 hours. At the end of this period, it was heated to atmospheric reflux and kept there for 60 minutes. At the end of this period, 780 grams of water, 24 grams of ghatti gum, and 4.8 grams of guar gum were added to the contents of the flask with vigorous agitation. Then 10.8 grams of aqueous phosphoric acid (42 percent) were added and the pH adjusted to 6.7. The contents of the flask were then brought to 95° C. and maintained at this temperature for 2 hours. At the end of this time, the contents of the flask were cooled to a temperature below 50° C. and discharged as a resin-in-water dispersion. The dispersion's viscosity (Brookfield spindle No. 2 at 30 rpm) was 890 cps. and the resin particle size was substantially between 5 and 18 microns. This material did not separate after standing for 12 weeks.

In the experiment of Example 6, the phenol/formaldehyde condensation reaction was carried out at a lower temperature than the other Examples herein, for the following reasons:

The condensation reaction between the t-butylphenol and formaldehyde is relatively slow because of the low solubility of t-butylphenol in water. The resole products of this reaction which contain three or more phenol nuclei contain hyperacidic phenolic hydroxyls, and therefore these products tend to lower the pH of the reaction mixture more than "conventional" resoles. For these two reasons, more alkali is required for catalysis. However, the higher concentration of alkali tends to increase the incidence of side reactions, especially the Cannizzaro reaction. But, the reaction rate of the desired condensation reaction is reduced by a much lesser degree than that of the Cannizzaro reaction by lowering the temperature. Therefore, a lower reaction temperature is used, which, although it requires a longer reaction time, serves to reduce the incidence of side reactions.

EXAMPLE 7

Preparation of Phenolic Dispersion (Phenol-Alkyl Phenol Derived) Using Ghatti Gum and Guar Gum Into a 5-liter, round bottom flask, equipped with a reflux condenser, agitator, thermometer and heating mantle, there was charged 600 grams of phenol, 600 grams of p-nonylphenol, 933 grams of aqueous formaldehyde (40 percent), and 24 grams of aqueous sodium hydroxide (25 percent). The mixture was heated to 85°

C. whereupon the heating mantle was lowered and the mixture allowed to reach a stage of atmospheric reflux through its exothermic heat of reaction. The mixture was then refluxed for 65 minutes. At the end of this period, 720 grams of water, 24 grams of gum ghatti, and 4.8 grams of guar gum were added to the contents of the flask. Then there was added to the flask 16 grams of aqueous phosphoric acid (42 percent) and the pH of the mixture adjusted to 6.65. The contents of the flask were then brought to 95° C. and maintained at this temperature for one hour. At the end of this time, the contents of the flask were cooled to a temperature below 50° C. and discharged as a resin-in-water dispersion. The viscosity (Brookfield spindle No. 2 at 30 rpm) of the dispersion was 2360 cps. and the resin particle size was substantially between 2 and 6 microns. The dispersion did not separate after standing 12 weeks.

CONTROL 3

This is an experiment illustrating the use of gum ghatti and "Darvan No. 2" in the preparation of a "Vinsol" modified phenolic resole in dispersion form, as described in the Hercules brochure on *Vinsol Resin as Modifier of Phenolic Resins*, copyright 1955, page 23.

Into a 5-liter, round bottom flask equipped with a reflux condenser, agitator, thermometer, and heating mantle, there was charged the following:

| Phenol | 1005 grams |
| Vinsol | 495 grams |
| 40 per cent Formaldehyde | 884 grams |
| Water | 67.5 grams |
| Paraformaldehyde | 350 grams |

This mixture was heated to atmospheric reflux with continuous stirring, and held until the paraformaldehyde had dissolved. The contents of the flask were then cooled to 26° C. and the following added:

| Ammonium Hydroxide 29.6 per cent | 318 grams |
| Gum Ghatti | 27 grams |
| Darvan No. 2 | 4.5 grams |

The resulting mixture was then heated to a temperature of 75° C., whereupon the heating mantle was removed, and the temperature allowed to rise through the exothermic heat of reaction. When the temperature reached 98° C., additional heating was used to bring the mixture to atmospheric reflux. Reaction at atmospheric reflux was continued for a total of 3 hours. The mixture was then cooled to below 40° C.

The resulting product was an aqueous dispersion of a phenolic resin having a particle size range from about 2 microns up to about 160 microns. Upon standing for 2 days at room temperature, the dispersed resin phase had settled, and could be redispersed only with vigorous stirring.

"Darvan No. 2" is supplied by the R. T. Vanderbilt Company. It is the "sodium salt of polymerized substituted benzoid alkyl sulfonic acids."

CONTROL 4

This experiment differs from Control 3 in that the "Vinsol" is omitted.

The apparatus and procedure of Control 3 were used. The following were charged to the 5-liter flask:

| Phenol | 1005 grams |
| 40 per cent Formaldehyde | 884 grams |
| Water | 67.5 grams |
| Paraformaldehyde | 307.5 grams |

The above mixture was heated at atmospheric reflux until the paraformaldehyde had dissolved. After cooling to 34° C., the following were added:

| Ammonium Hydroxide 29.6 per cent | 318 grams |
| Gum Ghatti | 27 grams |
| Darvan No. 2 | 4.5 grams |

The temperature of the mixture rose through the exothermic heat of reaction. When atmospheric reflux began, the reaction was moderated by cooling with a cold water bath as necessary to control foaming and prevent flooding of the condenser. After three hours at atmospheric reflux, the contents of the flask were cooled to below 40° C.

Microscope examination of the phenolic dispersion obtained show a wide range of particle sizes up to 160–200 microns in diameter with a large percentage of particles being 50 microns or larger.

The dispersions of this invention are stable for extended periods of time. For instance, in most cases, no appreciable settling of the resole particles occurs upon standing for 4 weeks, and in many cases, much longer, as the foregoing Examples illustrate.

CONTROL 5

By a procedure analogous to that described above in Example 1, it was attempted to produce an aqueous resole dispersion from the following materials:

| Material | Parts, by Weight | Grams |
|---|---|---|
| Phenol | 100 | 1300 |
| 40% aqueous Formaldehyde | 111 | 1443 |
| Barium hydroxide monohydrate | 2.5 | 32.5 |
| Water | 66 | 858 |
| Gum Tragacanth | 2.0 | 26 |
| Guar gum ("Jaguar 507", Stein, Hall) | 0.65 | 8.5 |
| 20% aqueous $H_2SO_4$ | 4.6–4.7 | 61 |

No phase inversion to a resin-in-water dispersion occurred upon stirring at 80° C. for 4 hours after the gums, water, and neutralizing acid were added.

CONTROL 6

By a procedure analogous to that described above in Example 1, it was attempted to produce an aqueous resole dispersion from the following materials:

| Material | Parts, by Weight | Grams |
|---|---|---|
| Phenol | 100 | 1300 |
| 40% aqueous Formaldehyde | 111 | 1443 |
| Barium hydroxide monohydrate | 2.5 | 32.5 |
| Water | 66 | 858 |
| Gum Karaya (Stein, Hall K-1) | 2 | 26 |
| Guar gum ("Jaguar 507") | 0.65 | 8.5 |
| 20% Sulfuric acid | 4.6 | 60 |

No phase inversion to a resin-in-water dispersion occurred upon stirring at 80° C. for 3½ hours after the gums, water, and neutralizing acid were added.

SCREENING TEST

Many materials that are known to have surfactant and/or emulsifying properties were examined to determine their suitability for use as interfacial agents in producing aqueous resole dispersions by a process analogous to that described in this application. The following screening test was employed to eliminate materials that would not be suitable (experience indicates that all materials that are suitable for use as interfacial agents in producing aqueous resole dispersions pass the screening test, although not all materials that pass the screening test are suitable interfacial agents):

A mixture containing 24 grams of 4,4'-bisphenol-A, 200 grams of m-cresol, 2.7 grams of 25 percent aqueous sodium hydroxide, and 307 grams of water is prepared. A 20 gram sample of this mixture is placed in a test tube, and 1 percent (0.2 gram) of the emulsifier to be evaluated is added. The mixture is stirred for 2 minutes, and the time required for settling is noted. The sample is acidified with 5 drops of 25 percent aqueous phosphoric acid, stirred again for 2 minutes, and the time required for settling is again noted. The emulsifier is considered to fail the test unless the time to settle is at least 24 hours. The Table below displays a series of surfactants that were subjected to this screening test, and the separation times found. Only three materials in this series passed the screening test — gum arabic, an ammonium lignin sulfonate, and a polyethoxy phenol phosphate (three other polyethoxy phenol phosphates failed).

CONTROL 7

The ammonium lignin sulfonate mentioned in Table I was tried as a replacement for the gum ghatti in the bisphenol-A based formulation described in Example 2, above, the remainder of the formulation and the procedure being essentially as described in said Example 2. The ammonium lignin sulfonate was not a successful interfacial agent in that experiment since only a partial phase inversion was obtained. It is a less stringent test of a material's interfacial properties to attempt to use it to make an aqueous resole dispersion from a bisphenol-A based formulation than from a phenol based formulation, because the former type resoles are generally easier to disperse in water than the latter.

CONTROLS 8-10

It was attempted to employ psillium seed gum, xanthan gum, and quince seed gum, as interfacial agents in experiments wherein each one was used as a direct replacement for the gum ghatti in the bisphenol-A based formulation mentioned above in Control 7. In each case, no phase inversion was obtained.

CONTROL 11

Flax seed gum was evaluated as an emulsifier in the screening test described above. It failed the screening test — only a very coarse dispersion was obtained.

CONTROL 12

It was attempted to produce an aqueous resole dispersion by a procedure analogous to the procedure described in Example 1, above, from the following formulation:

TABLE I

SURFACTANT TESTING

| Surfactant | Type | Separation Time (sec.) Basic | Acidic |
|---|---|---|---|
| Sipex UB | Na Lauryl Sulfate | 166 | 265 |
| Tergitol 08 | Na Ethxyl Sulfate | 160 | 160 |
| RWA 375 | Dibutylphenylphenol Na disulfonate | 180 | 160 |
| Alipal EP-10 | Polyethoxyphenol sulfate | 4050 | 150 |
| GAFAC PE-510 | Polyethoxyphenol phosphate | 720 | 925 |
| Aerosol OT | Octyl sulfosuccinate | 235 | 110 |
| Tergitol NP-44 | $(EtO)_{40}$—$C_9$ Phenol | 425 | 95 |
| Tergitol X H | Polyalkylene glycol ether | 340 | 80 |
| Triton - X100 | $C_8$ phenyl polyethyleneoxy ethanol | 398 | 170 |
| Aerosol MA | Dihexyl sulfosuccinate | 180 | 145 |
| DAXAD-30 | Na Alkyl Naphthalene sulfonate | 125 | 140 |
| Tergitol NPX | Polyethoxy nonyl phenol | 390 | 95 |
| BRIJ-30 | Polyethoxy Lauryl Ether | 440 | 95 |
| RENEX-697 | Polyethoxy nonyl phenol | 480 | 90 |
| Orzan A | $NH_4$ Lignin sulfonate | >24 hrs | >24 hrs |
| L-77 | Silicone | 430 | >675 |
| Benax 2A1 | Na, $C_{12}$ diphenyl ether disulfonate | 330 | 265 |
| Emulsifier 30 | Na $C_{12}$ phenyl sulfonate | 230 | 205 |
| Tergitol 15-S-5 | Polyethoxy linear alcohol | 1350 | 95 |
| Gum Arabic | Colloid | >24 hrs | >24 hrs |
| DAXAD 11 | K alkyl Naphthalene sulfonate | 240 | 235 |
| Gafac RE 960 | Polyethoxy phenol phosphate | 8050 | 95 |
| Gafac RE 610 | Polyethoxy phenol phosphate | 24 hrs | >24 hrs |
| Amp | Amino propan-1 | 150 | 85 |
| Tergitol OP-15 | Polyethoxy phenol | 850 | 45 |
| Ethomid 0/15 | Polyethoxy amide | 800 | 50 |
| Gafac RE 870 | Polyethoxy phenol phosphate | 650 | 95 |
| Na Xylene Sulfonate | Aryl sulfonate | 340 | 90 |
| Calgon T | Phosphate | 150 | 115 |
| Pluronic L-62D | Polyethoxy propoxy alcohol | 500 | 5–0 |
| Ethofat 242/25 | Polyethoxy ester | 450 | 45 |
| Aerosol A-103 | Di Na-polyethoxy $C_9$ phenol sulfosuccinate | 2000 | 325 |
| L-76 | Silicone | 465 | 115 |
| Antaron FC-34 | Fatty amide | 315 | 110 |
| Mironol JEM, Anhyd | Amphoteric | 1850 | 1025 |
| Tergitol NP-14 | Polyethoxy nonyl phenol | 441 | 110 |

| Constituent | Weight, grams |
| --- | --- |
| Phenol | 100 |
| 40% aqueous formaldehyde | 139 |
| Barium hydroxide | 2.5 |
| K-Dex 4484 | 2.0 |
| Guar gum | 0.5 |
| Water | 60 |
| 20% aqueous $H_2SO_4$ | 50 |

The experiment produced a large particle sized dispersion that settled immediately when diluted with water. "K-Dex 4484" is a "modified tapioca dextrain", that is recommended by its manufacturer (Stein, Hall) as a substitute for gum arabic in emulsifying applications.

Neither alkali metal soaps nor ammonium soaps can be used to produce aqueous resole dispersions by a process analogous to that described in this application because to retain their surfactant properties, and at such high pH's, the resoles, even if they could be produced in dispersion form, would be so chemically reactive that they would have very poor storage stability.

One would expect ethanolamine soaps to behave quite differently from gun ghatti in the preparation of aqueous resole dispersions because such soaps are cationic in nature, whereas gum ghatti is anionic.

Ammonia can not be used as a substitute for gum ghatti in producing aqueous resole dispersions by a process analogous to that described in this application because it would not yield a resin-in-water dispersion.

What is claimed is:

1. An aqueous dispersion containing dispersed particles of a phenolic resole in water, gum ghatti, and a thickening agent, substantially all of said particles having diameters below about 25 microns, wherein the molecular weight of said resole is such that said resole is substantially water-insoluble, wherein said gum ghatti is employed in an amount sufficient to stabilize said dispersion of resole particles in water, and wherein the thickening agent is employed in an amount such that the viscosity of said dispersion at 23° C. is at least about 500 centipoises.

2. The aqueous dispersion of claim 1 wherein said phenolic resole is the base-catalyzed reaction product of a phenol and formaldehyde, wherein the average diameter of said particles is below about 12 microns, and wherein the proportion of said resole in said dispersion is not greater than about 50 weight per cent, based on weight of resole plus water.

3. The aqueous dispersion of claim 2 wherein said phenolic resole has a weight average molecular weight within the range of from about 400 to about 3000.

4. The aqueous dispersion of claim 2 wherein said phenol is at least one member of the group consisting of monohydroxybenzene, alkylphenol, and 2,2-bis(4-hydroxyphenyl)propane.

5. The aqueous dispersion of claim 2 wherein substantially all of said particles have diameters below about 5 microns.

6. The aqueous dispersion of claim 5 wherein said particles have average diameters below about 3 microns.

7. The aqueous dispersion of claim 2 wherein said thickening agent is selected from the group consisting of guar gum, gum carrageenan, algin gum, locust bean gum, and water-soluble ethylene-maleic anhydride copolymers.

8. The aqueous dispersion of claim 2 wherein the gum ghatti is employed in an amount of from about 0.5 to about 5 parts by weight, and wherein the thickening agent is used in an amount of from about 0.1 to about 1 parts by weight, per 100 parts by weight of phenol employed to produce said resole.

9. A process for producing an aqueous dispersion of phenolic resole particles in water, which process comprises reacting a phenol with an aldehyde in the presence of a basic catalyst for a period of time and at a temperature sufficient to produce a substantially water-insoluble phenolic resole, and dispersing said phenolic resole, in situ, in an aqueous medium containing gum ghatti and a thickening agent, wherein said aqueous medium contains sufficient water to enable a phase inversion of occur during said dispersing step, thereby to produce a dispersion of phenolic resole in water, wherein said gum ghatti is employed in an amount sufficient to form and stabilize said dispersion of phenolic resole particles in water, and wherein said thickening agent is employed in an amount such that the viscosity of said dispersion at 23° C. is at least about 500 centipoises.

10. The process of claim 9 wherein said aldehyde is formaldehyde.

11. The process of claim 9 wherein said process includes the steps of:
   a. reacting a phenol with an aldehyde in a reaction mixture containing a basic catalyst for a period of time sufficient to produce a resole;
   b. adding to said reaction mixture gum ghatti, a thickening agent, and sufficient water to enable the production of a resole-in-water dispersion; and
   c. thereafter subjecting the reaction mixture to elevated temperature for a period of time sufficient to increase the weight average molecular weight of said resole to a value within the range of from about 400 to about 3000;

provided that the pH of said reaction is below about 9 prior to said step (c).

* * * * *

UNITED STATES PATENT AND TRADEMARK OFFICE
CERTIFICATE OF CORRECTION

PATENT NO. : 4,026,848
DATED : May 31, 1977
INVENTOR(S) : James Harding et al.

It is certified that error appears in the above-identified patent and that said Letters Patent are hereby corrected as shown below:

Column 13, line 13, delete "dextrain" and insert therefor
-- dextrin --.

Column 13, line 24, delete "gun" and insert therefor
-- gum --

Signed and Sealed this

Eleventh Day of December 1979

[SEAL]

*Attest:*

SIDNEY A. DIAMOND

*Attesting Officer*     *Commissioner of Patents and Trademarks*